United States Patent [19]

Ceriani

[11] 4,145,067

[45] Mar. 20, 1979

[54] SUSPENSION SYSTEM FOR A MOTOR VEHICLE

[75] Inventor: Enrico Ceriani, Samarate, Italy

[73] Assignee: ARCES S.r.l., Samarata (VA), Italy

[21] Appl. No.: 701,957

[22] Filed: Jul. 1, 1976

[30] Foreign Application Priority Data

Jul. 2, 1975 [IT] Italy .............................. 25026 A/75

[51] Int. Cl.² ............................................ B62K 25/08
[52] U.S. Cl. .................................. 280/276; 280/708; 280/714
[58] Field of Search ............... 280/276, 283, 708, 714; 188/289, 314; 267/64 R, 64 B, 65 R

[56] References Cited

U.S. PATENT DOCUMENTS

| | | | |
|---|---|---|---|
| 2,475,774 | 7/1949 | Benson | 280/276 |
| 3,036,844 | 5/1962 | Vogel | 280/708 |
| 3,077,345 | 2/1963 | Andersson | 280/708 X |
| 3,148,871 | 9/1964 | Wilkins | 280/708 X |
| 3,201,110 | 8/1965 | Taccone | 188/287 X |
| 3,451,510 | 6/1969 | Hartwig | 188/314 X |
| 3,550,992 | 12/1970 | Grancon | 280/708 X |
| 3,989,261 | 11/1976 | Kawaguchi | 280/276 |

*Primary Examiner*—Joseph F. Peters, Jr.
*Assistant Examiner*—Terrance L. Siemens
*Attorney, Agent, or Firm*—Edward R. Weingram

[57] ABSTRACT

A suspension system for a wheel driven, frame mounted motor vehicle including an inner rigid body telescoped into an outer rigid body with the pair of bodies interconnected between the wheel and the frame. A piston in the inner body extends into a piston chamber formed in the outer body. A connecting body having an expansion chamber formed therein is connected to the outer body, and has a deformable envelope disposed in the expansion chamber filled with compressible fluid under predetermined pressure. Hydraulic fluid fills the piston chamber and the expansion chamber. Valve means are connected to communicate hydraulic fluid between the piston chamber and the expansion chamber responsive to the piston movement whereby the deformable envelope will be compressed.

The valve means includes an inlet valve and an outlet valve with a recess formed in the piston chamber axially therebetween to limit and direct the fluid into the inlet valve. Both the inlet valve and the outlet valve are unidirectional. Two suspension systems or shock absorbers can serve as a fork for a motorcycle type vehicle.

10 Claims, 4 Drawing Figures

SUSPENSION SYSTEM FOR A MOTOR VEHICLE

BACKGROUND OF THE INVENTION

1. Field of the Invention

This invention relates to motor vehicle suspensions and more particularly to hydraulic suspensions used as shock absorbers.

2. Description of the Prior Art

Hydraulic suspension systems or shock absorbers of the prior art usually are designed to include a chamber which is filled with hydraulic liquid to a predetermined level. A free air space usually exists in the chamber above the hydraulic liquid. These suspension systems have not been designed to effectively prevent air from entering the hydraulic fluid and becoming entrapped in the fluid. This entrappment phenomena often occurs when the hydraulic system undergoes periods of prolonged or severe use, as for example, when incorporated in the forks of motorcycles, which are used for racing, sometimes over rough and irregular roads.

The air enters the hydraulic fluid (oil) in the form of small bubbles or forms an outright air-in-oil emulsion. The air in the oil defeats the smooth and predictable action of prior art suspension systems, which can cause or add to steering instability, in addition to poor shock absorbing characteristics.

SUMMARY OF THE INVENTION

It is an object of the present invention to provide an improved suspension system which overcomes the prior art disadvantages; which is simple, economical and reliable; which uses a sealed compressible fluid that cannot be intermixed with the hydraulic fluid; which uses an expansion chamber to house the sealed compressible fluid; which uses a recess to limit and direct hydraulic fluid displaced by a piston into the expansion chamber; which uses valve means to control flow to and from the expansion chamber; and which uses a control valve to introduce compressible fluid into the sealed deformable envelope disposed in the expansion chamber.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE PREFERRED EMBODIMENT

Figure 1:
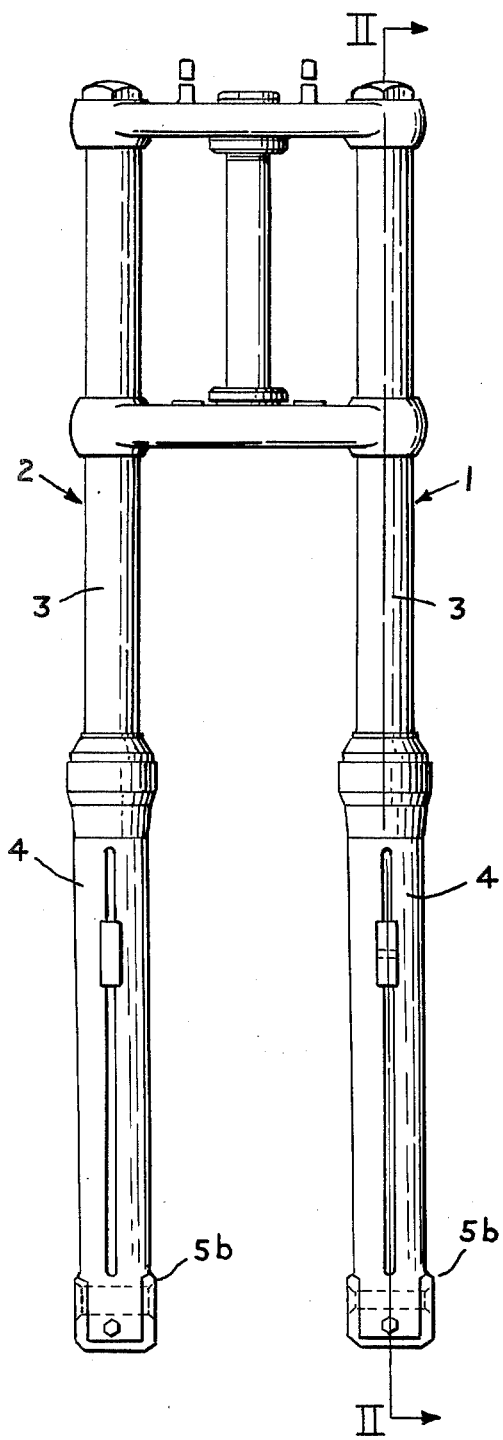
FIG. 1 is a front elevational schematic view of a motorcycle fork embodying the suspension system of the present invention.
Figure 2:
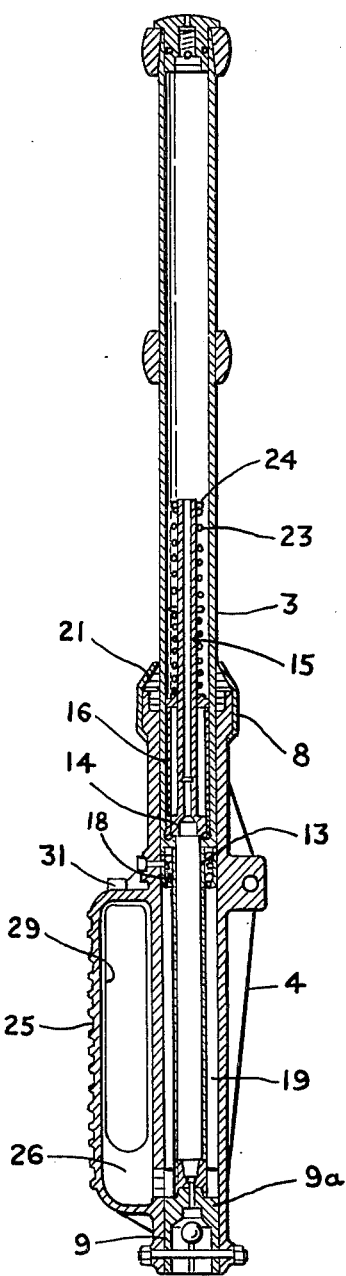
FIG. 2 is a side elevational view, partly in section, taken along line II—II of FIG. 1.
Figures 3, 4, 5:
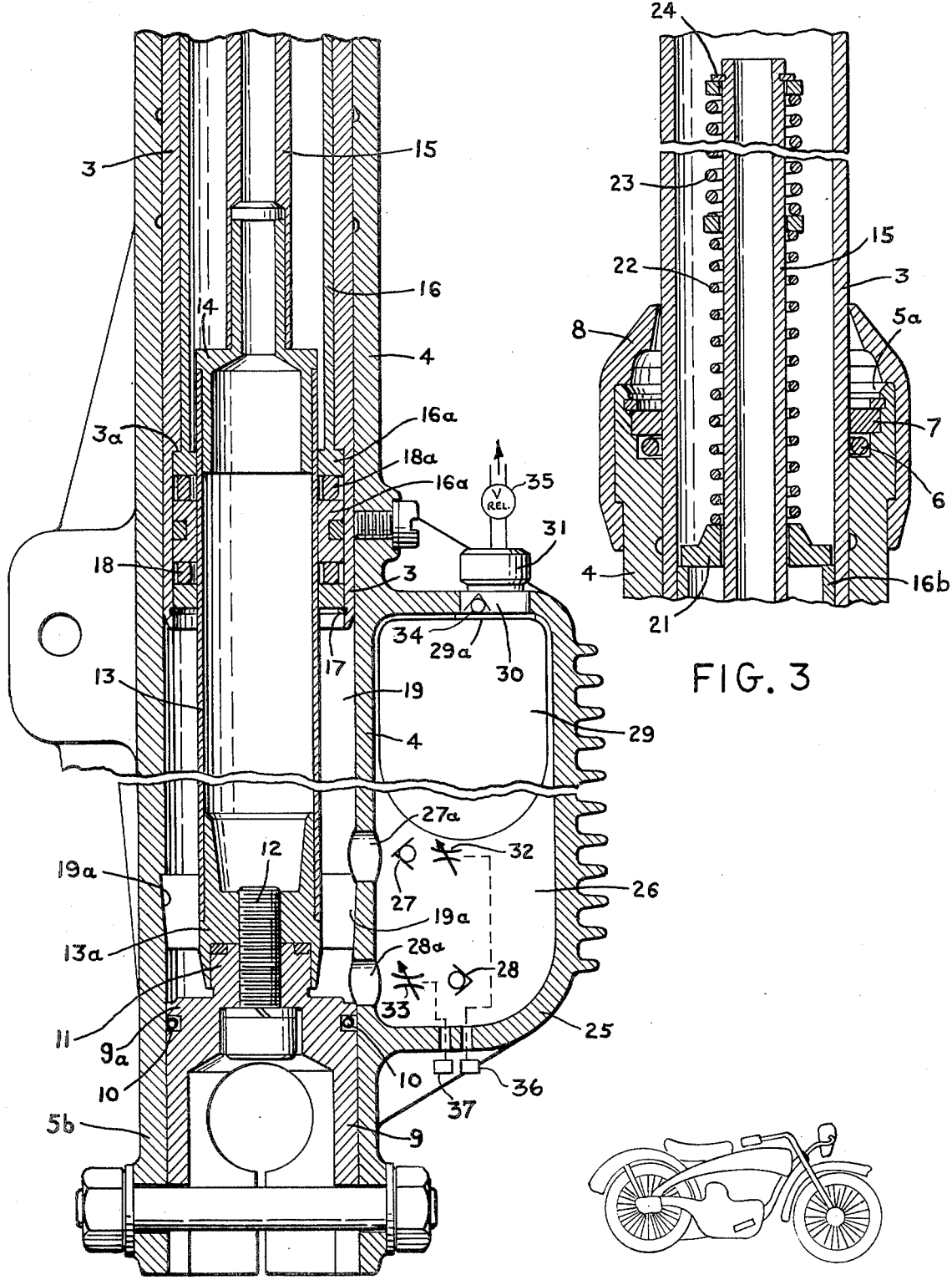
FIG. 3 is an enlarged partial view of the upper portion of FIG. 2.
FIG. 4 is an enlarged partial view of the lower portion of FIG. 2.
FIG. 5 is a sketch of a wheel driven frame mounted motor vehicle.

In the illustrated embodiment of the invention, the improved suspension system, designated generally as 1 and 2, define two equal arms of a fork for a motor vehicle, such as a motorcycle as shown in FIG. 5. Each of the suspension systems or shock absorbers 1 and 2 consist of a pair of tubular metallic bodies 3 and 4, reciprocally telescoped together. The inner body is 3 and the outer body is 4.

In particular, the tubular inner body 3 is rigid and is slidingly inserted in the tubular outer body 4 through an open end 5a thereof shown in FIG. 3, at which the outer body 4 is provided with an annular gasket 6 for the seal therebetween. A ring 7 protect a sleeve 8 protects body 3 at the joint at end 5a. At the other end 5b of the tubular body 4, there is inserted and affixed an inverted cup type cylindrical body 9, with an interposed gasket 10. The bottom 9a of the body 9 closes the end 5b. The body is of conventional design and will permit connection of the end 5b of outer body 4 on or to a wheel axle of a motor vehicle. In the bottom 9a of body 9 there is a centrally and coaxially formed projection 11, on which is fixed, by means of a screw 12, the bottom 13a of a cylindrical tube 13 which extends coaxially inside the tubular bodies 3 and 4.

At its other end the tube 13 is connected by means of a fitting 14 to a further tube 15 of smaller diameter, which extends coaxially in the tubular inner body 3.

A rigid cylindrical tube 16 is coaxially interposed between the tubular inner body 3 and the tube 13. The tube 16 is integrally connected to the tubular inner body 3 by a removable joint at its end portion 16a, of increased thickness, between an annular shoulder 3a of the inner body 3 and a stop ring 17, internally supported by the same inner body 3, near its innermost end at the tubular body 4. The inner body 3 along with the end portion 16a of the tube 16 defines a piston. The piston 16a can slide fluidproof on the tube 13 by interposition of gaskets 18 and 18a.

The piston 16a is movable axially in a cylindrical annular chamber or piston chamber 19 formed by the tubular outer body 4 and by the tube 13 therein. On the upper end 16b of the tube 16 is a support ring 21 coaxially and slidably mounted on tube 15 and subjected to the action of a spring 22, also mounted on said tube 15. A second spring 23 is mounted on tube 15 in series with the spring 22, relative to which the spring 23 has a greater elastic force. A stop ring 24 is connected to the tube 15, and prevents the springs 22 and 23 from being disengaged from tube 15 during the operation of the fork.

An elongated hollow body or connection body 25, whose inner wall is formed by a portion of the wall of the outer body 4 is fastened laterally relative to the outer body 4. The hollow connecting body 25 defines an expansion chamber 26 which is in communication with the annular piston chamber 19 through a unidirectional outlet valve 27 and a unidirectional inlet valve 28 respectively connected with through-holes 27a and 28a respectively, provided in the wall of the outer body 4 at a position spaced by a pre-determined amount along the same generatrix of said tubular body. The valves 28 and 27 define valve means each of which are unidirectional and together direct the flow of fluid in opposite directions. This is schematically indicated at 32 and 33 which shows two flow regulating valves, one for each unidirectional valve, which are controllable from the outside of the hollow connecting body 25 as shown schematically in FIG. 4 by control members 36 and 37 respectively for valves 32 and 33. It should be noted that in the outer body 4, between the holes 27a and 28a, there is formed a truncated cone portion or recess 19a, having downwardly turned conicity, whose minor diameter is equal to the inside diameter of the outer body 4.

In the expansion chamber 26 is positioned a pocket or deformable envelope 29, of deformable material, filled with fluid under pressure (for example, air, inert gases and the like). The material which forms the pocket is impermeable to this fluid. The pocket 29 is fastened to the hollow connecting body 25 only at its portion 29a of limited dimensions. An aperture is provided in portion 29a which can be connected with a source of fluid under pressure, not shown, through a passage 30 in housing 25 and a pressure regulating valve or device generally indicated by 31. The piston chamber 19 and 19a and the portion of the expansion chamber 26 unoccupied by the pocket 29 are completely filled up by the hydraulic fluid (oil) before the introduction of the fluid under pressure in said pocket.

When a motor vehicle equipped with the above described type fork encounters a jolt, bump or other major discontinuity in its course, the inner body 3 moves into the outer body 4 pushing the piston 16a into the piston chamber 19 thereby forcing the hydraulic fluid (oil) to flow into the adjacent expansion chamber 26 through the unidirectional valve 27. Which flow is resisted by the pressure exerted on the oil by pocket 29. The magnitude of the impact and hence the advance of the piston 16a into the piston chamber 19, will determine how much the pocket 29 is compressed by the oil.

At the end of the stress period the pocket 29 will return to its unstressed size and restore the hydraulic fluid (oil) to the system. Thus, the hydraulic fluid will be returned to the piston chamber 19 through the unidirectional valve 28 and this return brings the piston 16a and hence the inner body 3 intergral therewith back to the initial position.

During this return, and especially upon relatively large displacements of the inner body 3 with respect to the outer body 4, the upper end 16b of the tube 16 strikes against the ring 21 moving it upward counter to the action of the springs 22 and 23. The elastic forces of these springs are such as to insure an immediate repositioning of the inner body 3 to the initial position occupied by it before the impact of the wheel of the motor vehicle on the discontinuity of the course.

When as a result of a particularly intense stress the piston 16a at the lower end of the inner body 3 continues in the stroke beyond the hole 27a in the truncated cone portion or recess 19a of piston chamber 19, a hydraulic braking action occurs on it. In fact, since the hole 27a has been passed, the piston 16a will compress the oil and force it to pass through the gap between the outer wall of the piston and the inner wall of the truncated cone portion or recess 19a and to issue from the hole 27. This passage of oil exerts the braking action and ends when the piston 16a reaches the lower end of the truncated cone portion or recess 19a, at which point there occurs a hydraulic stop of the piston as said piston and the truncated cone shaped chamber or recess 19a have the same diameter there, and no oil can pass between the two.

The compressible fluid inside the pocket 29 can be charged to the desired pressure by using manometric means of any known kind. Advantageously the passage 30 admitting the compressible fluid to the pocket or deformable envelope 29 may be equipped with a check valve 34 for the charging of the fluid. Also, an adjustable pressure relief valve 35, can be used in which the counterpressure spring can be adjusted to diverse predetermined values established by the user of the motor vehicle.

When the compressible fluid has reached the desired pressure in the pocket 29, the pressure relief valve will be blocked by means not shown, so as to prevent the outflow of compressible fluid during the use of the motor vehicle.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. A suspension system for a wheel driven, frame mounted, motor vehicle comprising:

a pair of interconnected rigid bodies connected between the wheel and the frame, the inner body telescoping into the outer body;

a piston formed at the lower end of the inner body;

a piston chamber formed in the outer body below the piston;

a connecting body having an expansion chamber formed therein connected to the outer body;

a deformable envelope disposed in the expansion chamber filled with compressible fluid under predetermined pressure;

hydraulic fluid filling the piston chamber and the expansion chamber;

first valve means connected to communicate hydraulic fluid between the piston chamber and the expansion chamber responsive to piston movement whereby the deformable envelope will be compressed wherein;

the first valve means includes at least one unidirectional inlet valve to deliver fluid from the piston chamber to the expansion chamber and at least one unidirectional outlet valve to return the fluid from the expansion chamber into the piston chamber; and each of the unidirectional inlet valve and the unidirectional outlet valve include flow regulating valves which are controllable from outside the expansion chamber and the piston chamber.

2. A suspension system for a wheel driven, frame mounted, motor vehicle comprising:

a pair of interconnected rigid bodies connected between the wheel and the frame, the inner body telescoping into the outer body;

a piston formed at the lower end of the inner body;

a piston chamber formed in the outer body below the piston;

a connecting body having an expansion chamber formed therein connected to the outer body;

a deformable envelope disposed in the expansion chamber filled with compressible fluid under predetermined pressure;

hydraulic fluid filling the piston chamber and the expansion chamber;

first valve means connected to communicate hydraulic fluid between the piston chamber and the expansion chamber responsive to piston movement wereby the deformable envelope will be compressed; and the first valve means includes at least one unidirectional inlet valve to deliver fluid from the piston chamber to the expansion chamber and at least one unidirectional outlet valve to return the fluid from the expansion chamber into the piston chamber; and the inlet valve and the outlet valve are connected one axially above the other; and a recess is generated in the piston chamber from the inlet valve to the outlet valve.

3. The combination claimed in claim 2 wherein:

the piston chamber is cylindrical;

the piston is circular to be sealingly engaged within the cylindrical piston chamber;

the recess slopes radially inwardly and downwardly from the inlet valve to the outlet valve to terminate at the outlet valve so that the recess will entrap fluid therein and direct it to the inlet valve upon the piston entering the recess area.

4. The combination claimed in claim 3 wherein:

the recess defines a truncated cone-shape with the large diameter at the inlet valve, and the small diameter at the outlet valve which is equal to the cylinder size of the piston chamber.

5. The combination claimed in claim 2 wherein:

a second valve means is affixed in the connecting body in communication with the deformable envelope to increase or decrease the maximum pressure of the compressible fluid therein.

6. The combination claimed in claim 5 wherein:

the second valve means is disposed axially above the first valve means.

7. The combination claimed in claim 6 wherein:

the first valve means includes an inlet valve disposed axially above an outlet valve.

8. The combination claimed in claim 1 wherein:

the suspension system includes two pair of interconnected rigid bodies disposed substantially parallel to each other to define a fork for holding a wheel therebetween and interconnecting the wheel to the frame.

9. The combination claimed in claim 1 wherein:

a spring means is disposed in the inner body above the piston normally to bias the piston in the direction of the piston chamber.

10. The combination claimed in claim 1 wherein:

a second valve means including adjustable pressure relief valve means is affixed in the connecting body in communication with the deformable envelope to adjustably increase or decrease the pressure of the compressible fluid therein.

* * * * *